(12) United States Patent
Li et al.

(10) Patent No.: US 10,200,878 B2
(45) Date of Patent: Feb. 5, 2019

(54) NETWORK NODE DATA SCHEDULING METHOD, APPARATUS, AND SYSTEM

(71) Applicant: Huawei Technologies Co., Ltd., Shenzhen, Guangdong (CN)

(72) Inventors: Mingchao Li, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 15/639,836

(22) Filed: Jun. 30, 2017

(65) Prior Publication Data

US 2017/0303140 A1  Oct. 19, 2017

Related U.S. Application Data

(63) Continuation of application No. PCT/CN2014/095942, filed on Dec. 31, 2014.

(51) Int. Cl.
| | |
|---|---|
| *H04W 16/24* | (2009.01) |
| *H04W 4/00* | (2018.01) |
| *H04W 24/00* | (2009.01) |
| *H04W 36/00* | (2009.01) |
| *H04W 4/70* | (2018.01) |

(Continued)

(52) U.S. Cl.
CPC ............. *H04W 16/24* (2013.01); *H04W 4/00* (2013.01); *H04W 4/70* (2018.02); *H04W 24/00* (2013.01); *H04W 24/02* (2013.01); *H04W 36/00* (2013.01); *H04W 36/026* (2013.01); *H04W 36/04* (2013.01); *H04W 36/08* (2013.01); *H04W 36/18* (2013.01); *H04W 84/045* (2013.01)

(58) Field of Classification Search
CPC ..... H04W 36/14; H04W 36/08; H04W 36/30; H04W 36/0083; H04W 16/24; H04W 4/005

See application file for complete search history.

(56) References Cited

U.S. PATENT DOCUMENTS

| | | |
|---|---|---|
| 6,021,123 A | 2/2000 | Mimura |
| 2003/0095512 A1 | 5/2003 | Hepsaydir |

(Continued)

FOREIGN PATENT DOCUMENTS

| | | |
|---|---|---|
| CN | 101673471 A | 3/2010 |
| CN | 101727757 A | 6/2010 |

(Continued)

*Primary Examiner* — Jamal Javaid

(57) ABSTRACT

The present disclosure provides a network node data scheduling method, an apparatus, and a system. The method includes the following steps: obtaining, by user equipment, first system information of a current serving micro network node, determining, by the user equipment, a first shared carrier of a serving micro network node group according to the first system information, and transmitting, by the user equipment, service data according to the first system information by using the first shared carrier; when it is determined that a preset cell handover condition is met, handing over, by the user equipment, to a target cell, obtaining second system information of a target micro network node corresponding to the target cell, and transmitting the service data in the target cell according to the second system information by using a second shared carrier of a micro network node group to which the target micro network node belongs.

18 Claims, 5 Drawing Sheets

(51) Int. Cl.
    *H04W 36/08*     (2009.01)
    *H04W 24/02*     (2009.01)
    *H04W 36/02*     (2009.01)
    *H04W 36/04*     (2009.01)
    *H04W 36/18*     (2009.01)
    *H04W 84/04*     (2009.01)

(56) References Cited

U.S. PATENT DOCUMENTS

2010/0070167 A1    3/2010    Mudalige
2011/0310839 A1*  12/2011  Kenington ........ H04W 36/0072
                                                          370/331

FOREIGN PATENT DOCUMENTS

CN        102685828 A    9/2012
CN        103841564 A    6/2014

* cited by examiner

NETWORK NODE DATA SCHEDULING METHOD, APPARATUS, AND SYSTEM

CROSS-REFERENCE TO RELATED APPLICATIONS

This application is a continuation of International Application No. PCT/CN2014/095942, filed on Dec. 31, 2014, the disclosure of which is hereby incorporated by reference in its entirety.

TECHNICAL FIELD

The present disclosure relates to the field of wireless communications technologies, and in particular, to a network node data scheduling method, an apparatus, and a system.

BACKGROUND

With continuous development of the society and popularization of vehicles, to reduce urban traffic congestion and traffic accidents, improve transportation efficiency, and ensure personal safety, the intelligent transportation system (ITS) emerges. A vehicle may obtain road condition information or receive service information in a timely manner by means of vehicle to vehicle (V2V) communication or vehicle to infrastructure (V2I) communication. For example, the vehicle broadcasts, to surrounding vehicles by means of V2V communication, information such as a vehicle speed, a driving direction, a specific location, and whether there is an emergency brake, so that a driver obtaining the information can learn a traffic condition out of line of sight in a timely manner, predetermine an emergency, and take corresponding measures to avoid a traffic accident. A network used for V2V/V2I communication is referred to as Internet of Vehicles, and this technology may be used for communication of devices that move at a high speed.

In the prior art, V2V/V2I information may be transmitted by using a long term evolution (LTE) network. An Internet of Vehicles technology based on LTE generally uses a hierarchical network topology, that is, a network is divided into a macro network and a micro network. A spectrum of one micro network may be divided into multiple carriers, and each micro network node may open one or more carriers for a vehicle to send a V2V service or a V2I service, so that the micro network node can use different data transmission manners on different carrier, for example, a contention-based manner and a centralized scheduling manner. The micro network node may transmit service data in at least one transmission manner of the contention-based manner or the centralized scheduling manner.

However, a vehicle keeps moving and enters cells covered by different micro network nodes. Therefore, related configuration of the vehicle needs to be updated during micro cell change, so that data can be correctly transmitted on a carrier of a current cell.

The vehicle moves relatively fast, and a coverage area of a micro network node is relatively small. Therefore, the vehicle needs to frequently change a micro cell, and as a result, a micro cell configuration is frequently changed. Consequently, a service is frequently interrupted, a delay is increased, and user experience is compromised. In addition, a micro network node needs to frequently exchange signaling with the vehicle, and consequently, signaling is greatly consumed.

SUMMARY

The present disclosure provides a network node data scheduling method, an apparatus, and a system, so as to resolve prior-art problems of frequent service interruption and large signaling consumption caused because user equipment frequently changes a micro cell.

A first aspect of the present disclosure provides a network node data scheduling method, including:

obtaining, by user equipment, system information of multiple micro network nodes in a current serving micro network node group, and extracting first system information of a serving micro network node of the user equipment from the system information;

determining, by the user equipment, a first shared carrier of the serving micro network node group according to the first system information;

transmitting, by the user equipment according to the first system information by using the first shared carrier, service data in a serving cell covered by the serving micro network node; and when it is determined that a preset cell handover condition is met, handing over, by the user equipment, to a target cell, obtaining second system information of a target micro network node corresponding to the target cell, and transmitting the service data in the target cell according to the second system information by using a second shared carrier of a micro network node group to which the target micro network node belongs.

With reference to the first aspect, in a first implementation of the first aspect of the present disclosure, the method further includes:

obtaining, by the user equipment, a first node set of micro network nodes that are found from a micro network resource pool corresponding to the current serving micro network node group; where that it is determined that a preset cell handover condition is met specifically includes:

when the user equipment finds a second node set of newly added micro network nodes from the micro network resource pool, and determines that signal strength of a micro network node whose signal strength is highest in the first node set and the second node set is higher than signal strength of the serving micro network node within a preset time, determining that the preset cell handover condition is met.

With reference to the first aspect or the first implementation of the first aspect, in a second implementation of the first aspect of the present disclosure, the obtaining, by user equipment, system information of multiple micro network nodes in a current serving micro network node group, and extracting first system information of a serving micro network node of the user equipment from the system information specifically includes:

obtaining, by the user equipment, the system information from the micro network resource pool to which the current serving micro network node group belongs, and using system information whose signal strength is highest in the system information as the first system information.

With reference to the first aspect or the first implementation of the first aspect, in a third implementation of the first aspect of the present disclosure, before the obtaining, by user equipment, system information of multiple micro network nodes in a current serving micro network node group, the method further includes:

performing, by the user equipment, at least one of the following operations:

receiving, by the user equipment, system information that is of a micro network node and that is broadcasted by a base station, where the system information at least carries at least one piece of the following information: time domain information of the micro network resource pool or frequency domain information of the micro network resource pool; or receiving, by the user equipment, radio resource control (RRC) signaling sent by the base station, where the RRC signaling at least carries at least one piece of the following information: time domain information of the micro network resource pool or frequency domain information of the micro network resource pool;

performing, by the user equipment, at least the following operations: determining, by the user equipment, an address of the micro network resource pool according to the time domain information; or determining, by the user equipment, an address of the micro network resource pool according to the frequency domain information; and the obtaining, by user equipment, system information of multiple micro network nodes in a current serving micro network node group specifically includes:

obtaining, by the user equipment, the system information from the micro network resource pool according to the address of the micro network resource pool.

With reference to any one of the first aspect, or the first to the third implementations of the first aspect, in a fourth implementation of the first aspect of the present disclosure, the first system information includes a serving micro network node group identifier, the second system information includes a target micro network node group identifier, and the transmitting, by the user equipment, the service data in the target cell according to the second system information by using a second shared carrier of a micro network node group to which the target micro network node belongs specifically includes:

when it is determined that the target micro network node group identifier is the same as the serving micro network node group identifier, determining, by the user equipment, that the second shared carrier is the same as the first shared carrier, determining that the target micro network node and the serving micro network node belong to a same micro network node group, using the first shared carrier as the second shared carrier, and sending the service data on the first shared carrier in a contention-based scheduling manner.

With reference to any one of the first aspect, or the first to the fourth implementations of the first aspect, in a fifth implementation of the first aspect of the present disclosure, the system information further includes configuration information of a dedicated carrier, and the method further includes:

when it is determined that current service data needs to be transmitted on the dedicated carrier, updating, by the user equipment, the configuration information of the dedicated carrier, and transmitting the service data on the dedicated carrier whose configuration information is updated.

With reference to any one of the first aspect, or the first to the third implementations of the first aspect, in a sixth implementation of the first aspect of the present disclosure, the first system information includes a serving micro network node group identifier, the second system information includes a target micro network node group identifier, and the transmitting, by the user equipment, the service data in the target cell according to the second system information by using a second shared carrier of a micro network node group to which the target micro network node belongs specifically includes:

when it is determined that the target micro network node group identifier is different from the serving micro network node group identifier, updating, by the user equipment, the first shared carrier to the second shared carrier, and sending the service data on the second shared carrier in a contention-based scheduling manner.

With reference to any one of the first aspect, or the first to the third implementations of the first aspect, or the sixth implementation of the first aspect, in a seventh implementation of the first aspect of the present disclosure, the system information further includes configuration information of a dedicated carrier, and the method further includes:

when it is determined that current service data needs to be transmitted on the dedicated carrier, updating, by the user equipment, the configuration information of the dedicated carrier, and transmitting the service data on the dedicated carrier whose configuration information is updated.

With reference to any one of the first aspect, or the first to the seventh implementations of the first aspect, in an eighth implementation of the first aspect of the present disclosure, after the extracting first system information of a serving micro network node of the user equipment from the system information, the method further includes:

after it is determined that the service data fails to be transmitted on a shared carrier of the serving micro network node group, performing, by the user equipment, one of the following steps:

determining, by the user equipment, a base station to which the serving network node group belongs, and sending a resource scheduling request to the base station, so that the base station configures, for the user equipment, a target time-frequency resource for service transmission according to the resource scheduling request; or searching, by the user equipment, for micro network nodes in the micro network resource pool, setting, as the target micro network node, a micro network node whose signal strength is highest and is higher than a preset access threshold value, and transmitting the service data in a cell covered by the target micro network node.

With reference to the first aspect, in a ninth implementation of the first aspect of the present disclosure, the transmitting, by the user equipment according to the first system information by using the first shared carrier, service data in a serving cell covered by the serving micro network node specifically includes:

transmitting, by the user equipment in a contention-based scheduling manner according to the first system information by using the first shared carrier, the service data in the serving cell covered by the serving micro network node.

A second aspect of the present disclosure provides a network node data scheduling method, including:

after a micro network node receives configuration information that is of a micro network node group to which the micro network node belongs and that is sent by a base station, performing micro network node configuration on the micro network node according to the configuration information; and broadcasting, by the micro network node, system information of the micro network node on a shared carrier of the micro network node group, so that user equipment running in the micro network node group obtains first system information of a serving micro network node of the user equipment, determines a first shared carrier of a serving micro network node group according to the first system information, and transmits, by using the first shared carrier, service data in a serving cell covered by the serving micro network node; where shared carriers of all micro network nodes in one micro network node group have a same configuration.

With reference to the second aspect, in a first implementation of the second aspect of the present disclosure, the configuring, by a micro network node, the micro network node according to the configuration information, and broadcasting system information of the micro network node on a shared carrier of the micro network node group specifically includes:

enabling, by the micro network node, a target shared carrier according to a shared carrier list in the configuration information, determining, by using a preset correspondence between a micro network node and a transmission resource address, a target transmission resource address corresponding to the micro network node, and sending the system information according to a time-frequency resource location indicated by the target transmission resource address, where the system information at least includes at least one piece of the following information:

a micro network node identifier, a micro network node group identifier, a shared carrier list, a micro network node resource pool, configuration information of a dedicated carrier, or the correspondence between a micro network node and a transmission resource address.

With reference to the second aspect or the first implementation of the second aspect, in a second implementation of the second aspect of the present disclosure, the method further includes:

after the micro network node receives a shared carrier update message that is sent by the base station and that is sent by using the micro network node group, updating the shared carrier list according to the shared carrier update message.

A third aspect of the present disclosure provides a network node data scheduling method, including:

combining, by a base station, multiple micro network nodes in a preset physical area into one micro network node group according to a preset policy; and sending, by the base station, configuration information of the micro network node group to each micro network node in the micro network node group, so that the micro network node configures the micro network node according to the configuration information, and broadcasts system information of the micro network node on a shared carrier of the micro network node group, and user equipment moving in the micro network node group extracts first system information of a serving micro network node of the user equipment from the system information, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines, according to the second system information, a second shared carrier of a micro network node group to which the target micro network node belongs, and transmits the service data in the target cell by using the second shared carrier.

With reference to the third aspect, in a first implementation of the third aspect of the present disclosure, the method further includes:

performing, by the base station, at least one of the following steps:

configuring, by the base station, a correspondence between a micro network node and a transmission resource address; or adjusting, by the base station, a correspondence that is between a micro network node and a transmission resource address and that is sent by the micro network node group, and delivering the correspondence to the micro network node group.

With reference to the third aspect or the first implementation of the third aspect, in a second implementation of the third aspect of the present disclosure, the configuration information at least includes at least one piece of the following information:

a micro network node identifier, a micro network node group identifier, a shared carrier list, configuration information of a dedicated carrier, a micro network node resource pool, or the correspondence between a micro network node and a transmission resource address.

With reference to the second implementation of the third aspect, in a third implementation of the third aspect of the present disclosure, the sending, by the base station, configuration information of the micro network node group to each micro network node in the micro network node group specifically includes:

sending, by the base station to each micro network node in the micro network node group, the configuration information that carries the correspondence between a micro network node and a transmission resource address, so that each micro network node determines, according to the correspondence, a target transmission resource address corresponding to the micro network node, and broadcasts the system information of the micro network node on the shared carrier by using the target transmission resource address.

A fourth aspect of the present disclosure provides user equipment, including:

an obtaining module, configured to: obtain system information of multiple micro network nodes in a current serving micro network node group, and extract first system information of a serving micro network node of the user equipment from the system information;

a processing module, configured to determine a first shared carrier of the serving micro network node group according to the first system information obtained by the obtaining module; and a transmission module, configured to transmit, according to the first system information by using the first shared carrier, service data in a serving cell covered by the serving micro network node; where the obtaining module is further configured to: when it is determined that a preset cell handover condition is met, hand over to a target cell, and obtain second system information of a target micro network node corresponding to the target cell; and the transmission module is further configured to transmit the service data in the target cell according to the second system information by using a second shared carrier of a micro network node group to which the target micro network node belongs.

With reference to the fourth aspect of the present disclosure, in a first implementation of the fourth aspect of the present disclosure, the obtaining module is further configured to obtain a first node set of micro network nodes that are found from a micro network resource pool corresponding to the current serving micro network node group; where that it is determined that a preset cell handover condition is met specifically includes:

when the user equipment finds a second node set of newly added micro network nodes from the micro network resource pool, and determines that signal strength of a micro network node whose signal strength is highest in the first node set and the second node set is higher than signal strength of the serving micro network node within a preset time, determining that the preset cell handover condition is met.

With reference to the fourth aspect of the present disclosure or the first implementation of the fourth aspect, in a second implementation of the fourth aspect of the present disclosure, the obtaining module is specifically configured to:

obtain the system information from the micro network resource pool to which the current serving micro network node group belongs, and use system information whose signal strength is highest in the system information as the first system information.

With reference to the fourth aspect of the present disclosure or the first implementation of the fourth aspect, in a third implementation of the fourth aspect of the present disclosure, the transmission module is further configured to perform at least one of the following operations:

receiving system information that is of a micro network node and that is broadcasted by a base station, where the first system information at least carries at least one piece of the following information: time domain information of the micro network resource pool or frequency domain information of the micro network resource pool; or receiving radio resource control (RRC) signaling sent by the base station, where the RRC signaling at least carries at least one piece of the following information: time domain information of the micro network resource pool or frequency domain information of the micro network resource pool;

the processing module is specifically configured to perform at least the following operations: determining an address of the micro network resource pool according to the time domain information; or determining an address of the micro network resource pool according to the frequency domain information; and the obtaining module is specifically configured to obtain the system information from the micro network resource pool according to the address of the micro network resource pool.

With reference to any one of the fourth aspect, or the first to the third implementations of the fourth aspect of the present disclosure, in a fourth implementation of the fourth aspect of the present disclosure, the first system information includes a serving micro network node group identifier, and the second system information includes a target micro network node group identifier;

the processing module is further configured to: when it is determined that the target micro network node group identifier is the same as the serving micro network node group identifier, determine that the second shared carrier is the same as the first shared carrier, determine that the target micro network node and the serving micro network node belong to a same micro network node group, and use the first shared carrier as the second shared carrier; and the transmission module is specifically configured to send the service data on the first shared carrier in a contention-based scheduling manner.

With reference to any one of the fourth aspect, or the first to the fourth implementations of the fourth aspect of the present disclosure, in a fifth implementation of the fourth aspect of the present disclosure, the processing module is further configured to: when the system information further includes configuration information of a dedicated carrier, and it is determined that current service data needs to be transmitted on the dedicated carrier, update the configuration information of the dedicated carrier; and the transmission module is further configured to transmit the service data on the dedicated carrier whose configuration information is updated.

With reference to any one of the fourth aspect, or the first to the third implementations of the fourth aspect of the present disclosure, in a sixth implementation of the fourth aspect of the present disclosure, the first system information includes a serving micro network node group identifier, the second system information includes a target micro network node group identifier, and the processing module is specifically configured to:

when it is determined that the target micro network node group identifier is different from the serving micro network node group identifier, update the first shared carrier to the second shared carrier; and the transmission module is specifically configured to send the service data on the second shared carrier in a contention-based scheduling manner.

With reference to any one of the fourth aspect, or the first to the third implementations of the fourth aspect of the present disclosure, or the sixth implementation of the first aspect, in a seventh implementation of the fourth aspect of the present disclosure, the processing module is further configured to:

when the system information further includes configuration information of a dedicated carrier, and it is determined that current service data needs to be transmitted on the dedicated carrier, update the configuration information of the dedicated carrier; and the transmission module is further configured to transmit the service data on the dedicated carrier whose configuration information is updated.

With reference to any one of the fourth aspect, or the first to the sixth implementations of the fourth aspect of the present disclosure, in an eighth implementation of the fourth aspect of the present disclosure, the processing module is further configured to:

after it is determined that the service data fails to be transmitted on a shared carrier of the serving micro network node group, perform one of the following steps:

determining a base station to which the serving network node group belongs, and sending a resource scheduling request to the base station, so that the base station configures, for the user equipment, a target time-frequency resource for service transmission according to the resource scheduling request; or searching for micro network nodes in the micro network resource pool, setting, as the target micro network node, a micro network node whose signal strength is highest and is higher than a preset access threshold value, and transmitting the service data in a cell covered by the target micro network node.

With reference to the fourth aspect, in a ninth implementation of the fourth aspect of the present disclosure, the transmission module is specifically configured to:

transmit, in a contention-based scheduling manner according to the first system information by using the first shared carrier, the service data in the serving cell covered by the serving micro network node.

A fifth aspect of the present disclosure provides a micro network node, including:

a processing module, configured to: after receiving configuration information that is of a micro network node group to which the micro network node belongs and that is sent by a base station, perform micro network node configuration on the micro network node according to the configuration information; and a sending module, configured to broadcast system information of the micro network node on a shared carrier that is of the micro network node group and that corresponds to the configuration information received by the processing module, so that user equipment moving in the micro network node group obtains first system information of a serving micro network node of the user equipment, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines, according to the second system information, a second shared carrier of a micro network node group to which the target micro network node belongs, and transmits the service data in the target cell by using the second shared carrier; where shared carriers of all micro network nodes in one micro network node group have a same configuration.

With reference to the fifth aspect, in a first implementation of the fifth aspect of the present disclosure, the processing module is specifically configured to: enable a target shared carrier according to a shared carrier list in the configuration information, and determine, by using a preset correspondence between a micro network node and a transmission resource address, a target transmission resource address corresponding to the micro network node; and the sending module is specifically configured to send the system information according to a time-frequency resource location indicated by the target transmission resource address, where the system information at least includes at least one piece of the following information:

a micro network node identifier, a micro network node group identifier, a shared carrier list, a micro network node resource pool, configuration information of a dedicated carrier, or the correspondence between a micro network node and a transmission resource address.

With reference to the fifth aspect or the first implementation of the fifth aspect, in a second implementation of the fifth aspect of the present disclosure, the processing module is further configured to:

after a shared carrier update message that is sent by the base station and that is sent by using the micro network node group is received, update the shared carrier list according to the shared carrier update message.

A sixth aspect of the present disclosure provides a base station, including:

a processing module, configured to combine multiple micro network nodes in a preset physical area into one micro network node group according to a preset policy; and a sending module, configured to send configuration information of the micro network node group to each micro network node in the micro network node group obtained by the processing module by means of combining, so that each micro network node configures the micro network node according to the configuration information, and broadcasts system information of the micro network node on a shared carrier of the micro network node group, and user equipment moving in the micro network node group extracts first system information of a serving micro network node of the user equipment from the system information, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines, according to the second system information, a second shared carrier of a micro network node group to which the target micro network node belongs, and transmits the service data in the target cell by using the second shared carrier.

With reference to the sixth aspect, in a first implementation of the sixth aspect, the processing module is configured to perform at least one of the following steps:

configuring a correspondence between a micro network node and a transmission resource address; or adjusting a correspondence that is between a micro network node and a transmission resource address and that is sent by the micro network node group, and delivering the correspondence to the micro network node group.

With reference to the sixth aspect or the first implementation of the sixth aspect, in a second implementation of the sixth aspect of the present disclosure, the configuration information at least includes at least one piece of the following information:

a micro network node identifier, a micro network node group identifier, a shared carrier list, configuration information of a dedicated carrier, a micro network node resource pool, or the correspondence between a micro network node and a transmission resource address.

With reference to the sixth aspect, or the first or the second implementation of the sixth aspect, in a third implementation of the sixth aspect of the present disclosure, the sending module is specifically configured to:

send, to each micro network node in the micro network node group, the configuration information that carries the correspondence between a micro network node and a transmission resource address, so that each micro network node determines, according to the correspondence, a target transmission resource address corresponding to the micro network node, and broadcasts the system information of the micro network node on the shared carrier by using the target transmission resource address.

A seventh aspect of the present disclosure provides a communications system, including:

the user equipment according to the fourth aspect and the first to the ninth implementations of the fourth aspect;

the micro network node according to the fifth aspect and the first to the second implementations of the fifth aspect; and the base station according to the sixth aspect and the first to the third implementations of the sixth aspect.

According to the network node data scheduling method provided in the embodiments of the present disclosure, user equipment obtains first system information of a current serving micro network node, determines a first shared carrier of a serving micro network node group according to the first system information, and transmits service data according to the first system information by using the first shared carrier. When it is determined that a preset cell handover condition is met, the user equipment hands over to a target cell, obtains second system information of a target micro network node corresponding to the target cell, and transmits the service data in the target cell according to the second system information by using a second shared carrier of a micro network node group to which the target micro network node belongs. This can effectively reduce service interruption frequency when the user equipment hands over to a micro cell, and reduce a service delay and signaling consumption.

DETAILED DESCRIPTION

Figure 1:
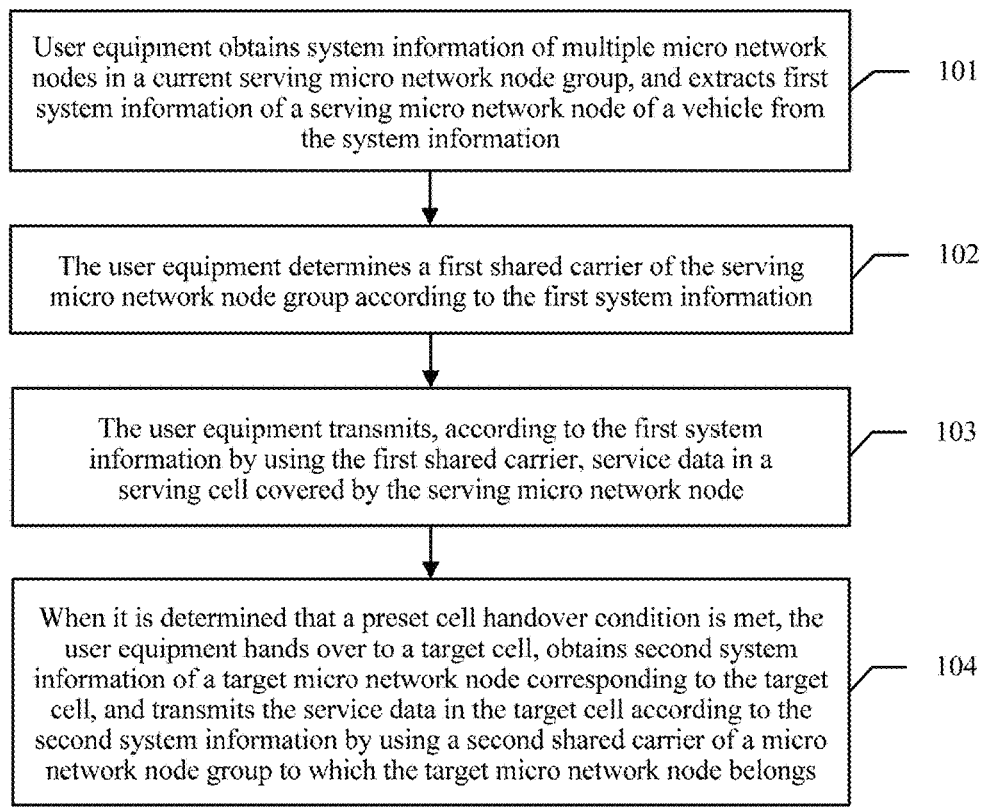
FIG. 1 is a schematic diagram of an embodiment of a network node data scheduling method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the data termed in such a way is interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. The module division in this specification is merely logical function division and may be other division in actual implementation. For example, multiple modules may be combined or integrated into another system, or some features may be ignored or not performed. In addition, the displayed or discussed mutual couplings or direct couplings or communication connections may be implemented by using some interfaces. The indirect couplings or communication connections between the modules may be implemented in electronic or other forms, and this is not limited in this specification. In addition, the modules or submodules described as separate parts may or may not be physically separate, may or may not be physical modules, or may be distributed on multiple circuit modules. Some or all of the modules may be selected according to actual needs to achieve the objectives of the solutions of the embodiments in the present disclosure.

Embodiments of the present disclosure provide a network node data scheduling method, an apparatus, and a system that are mainly applied to Internet of Vehicles, so as to resolve prior-art problems of frequent service interruption and large signaling consumption caused because user equipment frequently changes a micro cell. Internet of Vehicles based on LTE mainly includes a macro network and a micro network, one micro network may be divided into multiple carriers, and each micro network node opens at least one carrier that is used by the user equipment to send a V2V and V2I service. For example, the micro network has three carriers: F1, F2, and F3, a micro network node 1 opens F1, F2, and F3, a micro network node 2 opens F2 and F3, and a micro network node 3 opens F2. The micro network node may use different data transmission manners on different carriers. The micro network node 1 performs transmission on F1 and F2 in a contention-based manner, and performs transmission on F3 in a centralized scheduling manner. The micro network node 2 performs transmission on F2 in a hybrid transmission manner obtained by combining a contention-based manner and a centralized scheduling manner, and performs transmission on F3 in a contention-based manner. The micro network node 3 performs transmission on F2 in a contention-based manner.

With constant movement of user equipment, the user equipment enters cells covered by different micro network nodes. When changing a micro cell, the user equipment needs to update a configuration to execute a correct data transmission manner on a carrier of a current serving cell.

It may be understood that a network node data scheduling method in the embodiments of the present disclosure may also be applied to another similar communications system such as a military battle communications system. The user equipment in this specification is an intelligent device that moves at high speed, may be a vehicle on land or a handheld communication device of a user, or may be another similar device such as a reconnaissance aircraft or a detector. This specification sets no specific limitation.

The following describes a network node data scheduling method according to an embodiment of the present disclosure in detail from a user equipment side. Referring to FIG. 1, this embodiment of the present disclosure includes the following steps.

101. User equipment obtains system information of multiple micro network nodes in a current serving micro network node group, and extracts first system information of a serving micro network node of the user equipment from the system information.

Because each micro network node constantly broadcasts system information of the micro network node, the user equipment may obtain any broadcasted system information in the group. The user equipment specifically obtains the first system information in the following manner:

The user equipment obtains, by searching a micro network resource pool, the system information broadcasted by each micro network node, determines, from the system information, system information whose signal strength is highest within a preset time, obtains a target micro network node identifier from the system information whose signal strength is highest, uses a micro network node corresponding to the target micro network node identifier as the serving micro network node, and uses the system information as the first system information.

102. The user equipment determines a first shared carrier of a serving micro network node group according to the first system information.

There is at least one shared carrier, and the shared carrier is opened by all micro network nodes in a micro network node group, and is used to provide a V2V/V2I business service for the user equipment. Specifically, an opened shared carrier may exist in a form of a list. This specification sets no limitation on a specific presentation manner. In addition, transmission manners are the same on the shared carrier, that is, a contention-based scheduling manner.

103. The user equipment transmits, according to the first system information by using the first shared carrier, service data in a serving cell covered by the serving micro network node.

Specifically, the user equipment may perform the following operations according to the first system information:

storing a micro network node group identifier; sending V2V/V2I service data on the first shared carrier in a contention-based scheduling manner; obtaining, according to a resource location indicated by the micro network resource pool, system information broadcasted by all micro network nodes; and storing configuration information of a dedicated carrier, so that when special service data needs to be sent on the dedicated carrier, the special service data is transmitted on a specified dedicated carrier according to the configuration information of the dedicated carrier by using corresponding configuration.

104. When it is determined that a preset cell handover condition is met, the user equipment hands over to a target cell, obtains second system information of a target micro network node corresponding to the target cell, and transmits the service data in the target cell according to the second system information by using a second shared carrier of a micro network node group to which the target micro network node belongs.

During constant movement, the user equipment may cross different micro cells, may directly perform handover in micro cells covered by a micro network node group, or may hand over to a micro cell covered by another micro network node group. When the preset cell handover condition is met, the user equipment hands over to the target cell, and transmits the V2V/V2I service data by using the second shared carrier of the micro network node group to which the target micro network node belongs.

In this embodiment of the present disclosure, user equipment obtains first system information of a current serving micro network node, determines a first shared carrier of a serving micro network node group according to the first system information, and transmits service data according to the first system information by using the first shared carrier. When it is determined that a preset cell handover condition is met, the user equipment hands over to a target cell, obtains second system information of a target micro network node corresponding to the target cell, and transmits the service data in the target cell according to the second system information by using a second shared carrier of a micro network node group to which the target micro network node belongs. In this way, during intra-group cell handover, the first shared carrier continues to be used, a service is not interrupted, and a delay is reduced. During inter-group handover, a service is interrupted only when the first shared carrier is switched to the second shared carrier. A combination of the two effectively reduces service interruption frequency, a service delay, and signaling consumption.

Optionally, on the basis of the embodiment corresponding to FIG. 1, in a first optional embodiment of this embodiment of the present disclosure, the method further includes:

obtaining, by the user equipment, a first node set of micro network nodes that are found from a micro network resource pool corresponding to the current serving micro network node group; where that it is determined that a preset cell handover condition is met specifically includes:

when the user equipment finds a second node set of newly added micro network nodes from the micro network resource pool, and determines that signal strength of a micro network node whose signal strength is highest in the first node set and the second node set is higher than signal strength of the serving micro network node within a preset time, determining that the preset cell handover condition is met.

It may be understood that, because the user equipment keeps moving, the user equipment constantly searches for surrounding micro network nodes. When finding newly added micro network nodes, the user equipment automatically measures signal strength of all currently found micro network nodes. If signal strength of a micro network node is always highest within a preset time, the user equipment meets the preset cell handover condition, and the user equipment may use the micro network node whose signal strength is highest. This is similar to a case in which a mobile phone constantly searches for surrounding base stations, so that the mobile phone hands over to a base station with a strongest signal. Details are not described in this specification.

Optionally, on the basis of the embodiment corresponding to FIG. 1 and the first optional embodiment, in a second optional embodiment of this embodiment of the present disclosure, that user equipment obtains system information of multiple micro network nodes in a current serving micro network node group, and extracts first system information of a serving micro network node of the user equipment from the system information specifically includes:

obtaining, by the user equipment, the system information from the micro network resource pool to which the current serving micro network node group belongs, and using system information whose signal strength is highest in the system information as the first system information.

Specifically, the user equipment may receive time/frequency domain information that is of the micro network resource pool and that is sent by a base station, obtain the system information of the micro network node from the micro network resource pool according to the time/frequency domain information, measure each piece of system information within a preset time, and use system information whose signal strength is highest and reaches a preset first threshold value as the first system information.

It may be understood that there may be one or more micro network resource pools. When there is only one micro network resource pool, all micro network node groups correspond to the micro network resource pool, and when there are multiple micro network resource pools, micro network nodes in one micro network node group correspond to a same micro network resource pool. Specifically, the multiple micro network resource pools may be considered as one overall micro network resource pool, and each micro network node uniquely corresponds to a transmission resource address in a corresponding micro network resource pool. The micro network node may broadcast system information of the micro network node by using the transmission resource address. This specification sets no limitation, and details are not described.

Optionally, on the basis of the embodiment corresponding to FIG. 1 and the first optional embodiment, in a third optional embodiment of this embodiment of the present disclosure, before the user equipment obtains the system information of the multiple micro network nodes in the current serving micro network node group, the method further includes:

performing, by the user equipment, at least the following operations:

receiving, by the user equipment, system information that is of a micro network node and that is broadcasted by a base station, where the system information at least carries at least one piece of the following information: time domain information of the micro network resource pool or frequency domain information of the micro network resource pool; or receiving, by the user equipment, radio resource control (RRC) signaling sent by the base station, where the RRC signaling at least carries at least one piece of the following information: time domain information of the micro network resource pool or frequency domain information of the micro network resource pool;

performing, by the user equipment, at least the following operations: determining, by the user equipment, an address of the micro network resource pool according to the time domain information; or determining, by the user equipment, an address of the micro network resource pool according to the frequency domain information; and that user equipment obtains system information of multiple micro network nodes in a current serving micro network node group specifically includes:

obtaining, by the user equipment, the system information from the micro network resource pool according to the address of the micro network resource pool.

Optionally, on the basis of the embodiment corresponding to FIG. 1 and the first to the third optional embodiments, in a fourth optional embodiment of this embodiment of the present disclosure, the first system information includes a serving micro network node group identifier, the second system information includes a target micro network node group identifier, and that the user equipment transmits the service data in the target cell according to the second system information by using a second shared carrier of a micro network node group to which the target micro network node belongs specifically includes:

when it is determined that the target micro network node group identifier is the same as the serving micro network node group identifier, determining, by the user equipment, that the second shared carrier is the same as the first shared carrier, determining that the target micro network node and the serving micro network node belong to a same micro network node group, using the first shared carrier as the second shared carrier, and sending the service data on the first shared carrier in a contention-based scheduling manner.

It may be understood that the first shared carrier represents a type of shared carrier currently used by the user equipment, and the user equipment may use only one shared carrier, or may use multiple shared carriers at the same time. This may be specifically determined according to a service requirement and a quantity of shared carriers of the current serving micro network node group.

Because each micro network node in each micro network node group opens at least one shared carrier, the at least one shared carrier may be stored in a form of a carrier list.

If there is only one shared carrier, that is, the first shared carrier, in a carrier list of the current serving micro network node group, the user equipment performs handover between micro cells in the serving micro network node group, and continues to use the first shared carrier.

If there are multiple shared carriers in a carrier list of the current serving micro network node group, the user equipment may currently use only one shared carrier thereof, may use some shared carriers, or may use all shared carriers. The user equipment performs handover between micro cells in the serving micro network node group without switching a shared carrier, and may continue to use the previous first shared carrier.

That is, regardless of the quantity of shared carriers in the carrier list of the serving micro network node group, the current first shared carrier continues to be used during micro cell handover in the serving micro network node group, to avoid service interruption due to shared carrier switching.

Optionally, on the basis of the embodiment corresponding to FIG. 1 and the first to the fourth optional embodiments, in a fifth optional embodiment of this embodiment of the present disclosure, the system information further includes configuration information of a dedicated carrier, and the method further includes:

when it is determined that current service data needs to be transmitted on the dedicated carrier, updating, by the user equipment, the configuration information of the dedicated carrier, and transmitting the service data on the dedicated carrier whose configuration information is updated.

Optionally, on the basis of the embodiment corresponding to FIG. 1 and the first to the third optional embodiments, in a sixth optional embodiment of this embodiment of the present disclosure, the first system information includes a serving micro network node group identifier, the second system information includes a target micro network node group identifier, and that the user equipment transmits the service data in the target cell according to the second system information by using a second shared carrier of a micro network node group to which the target micro network node belongs specifically includes:

when it is determined that the target micro network node group identifier is different from the serving micro network node group identifier, updating, by the user equipment, the first shared carrier to the second shared carrier, and sending the service data on the second shared carrier in a contention-based scheduling manner.

The contention-based scheduling manner mainly includes the following several types:

a carrier sense multiple access with collision avoidance (CSMA/CA) technology used in 802.11p, a short range communications (device to device (D2D)) technology in a cellular network, a space/time division multiple access (STDMA) technology.

Optionally, on the basis of the embodiment corresponding to FIG. 1 and the first, the second, and the sixth optional embodiments, in a seventh optional embodiment of this embodiment of the present disclosure, the system information further includes configuration information of a dedicated carrier, and the method further includes:

when it is determined that current service data needs to be transmitted on the dedicated carrier, updating, by the user equipment, the configuration information of the dedicated carrier, and transmitting the service data on the dedicated carrier whose configuration information is updated.

It may be understood that the user equipment always transmits the service data preferably on a shared carrier, and the user equipment may use the dedicated carrier only when special or specified service data (for example, a service that has a relatively high requirement on service of quality) needs to be transmitted on the dedicated carrier, or when the shared carrier is invalid.

Optionally, on the basis of the embodiment corresponding to FIG. 1 and the first to the seventh optional embodiments, in an eighth optional embodiment of this embodiment of the present disclosure, after the first system information of the serving micro network node of the user equipment is extracted from the system information, the method further includes:

after it is determined that the service data fails to be transmitted on a shared carrier of the serving micro network node group, performing, by the user equipment, one of the following steps:

determining, by the user equipment, a base station to which the serving network node group belongs, and sending a resource scheduling request to the base station, so that the base station configures, for the user equipment, a target time-frequency resource for service transmission according to the resource scheduling request (it may be understood that the user equipment may determine the base station according to the first system information, or may directly determine a base station that currently serves the user equipment, and this specification sets no specific limitation); and searching, by the user equipment, for micro network nodes in the micro network resource pool, setting, as the target micro network node, a micro network node whose signal strength is highest and is higher than a preset access threshold value, and transmitting the service data in a cell covered by the target micro network node.

A case in which the data fails to be transmitted at least includes: a quantity of times that collision occurs during data transmission exceeds a preset second threshold value, the user equipment cannot communicate with a micro network, and signal strength is relatively poor. Specifically, there may be another similar case, and the specification sets no limitation.

Figure 2:
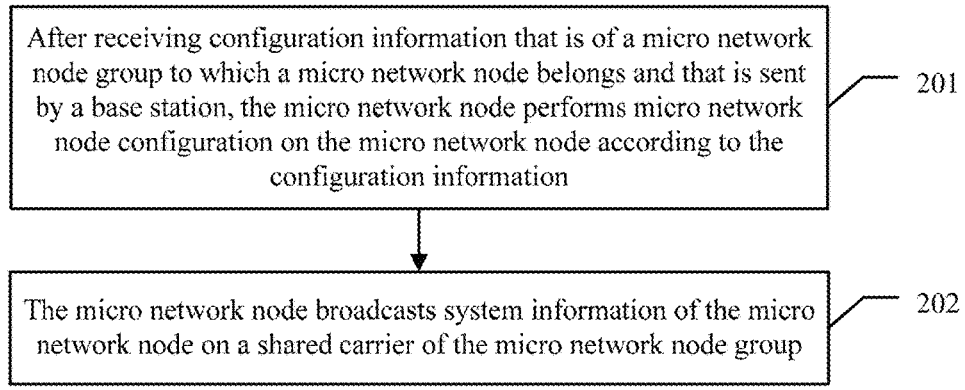
FIG. 2 is a schematic diagram of another embodiment of a network node data scheduling method according to an embodiment of the present disclosure.

A network node data scheduling method according to an embodiment of the present disclosure is described above in detail from a user equipment side, and the following describes an embodiment of the present disclosure from a micro network node side. Referring to FIG. 2, this embodiment of the present disclosure includes the following steps.

201. After receiving configuration information that is of a micro network node group to which a micro network node belongs and that is sent by a base station, the micro network node performs micro network node configuration on the micro network node according to the configuration information.

The base station respectively delivers, according to a preset rule, different configuration information to all micro network nodes in a corresponding micro network node group.

There are multiple micro network node groups, each micro network node group includes multiple micro network nodes, and shared carriers of all micro network nodes in one micro network node group have a same configuration.

202. The micro network node broadcasts system information of the micro network node on a shared carrier of the micro network node group.

The micro network node broadcasts the system information of the micro network node on the shared carrier of the micro network node group, so that user equipment running in the micro network node group obtains first system information of a serving micro network node of the user equipment, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, and transmits the service data in the target cell according to the second system information.

It may be understood that in this embodiment, when moving in one micro network node group, the user equipment always uses a shared carrier of the micro network node group, and a service is not interrupted. Further, when moving in another micro network node group, the user equipment only uses a shared carrier of a current micro network node group. This means that a shared carrier needs to be switched only when the user equipment crosses micro network node groups.

Each micro network node broadcasts system information of the micro network node on the shared carrier, so that the user equipment can obtain the system information of the micro network node when moving in a cell covered by the micro network node.

In this embodiment of the present disclosure, after receiving configuration information that is of a micro network node group to which the micro network node belongs and that is sent by a base station, a micro network node performs micro network node configuration on the micro network node according to the configuration information, and broadcasts system information of the micro network node on a shared carrier of the micro network node group, so that user equipment obtains first system information of a serving micro network node, determines a first shared carrier of a serving micro network node group according to the first system information, and transmits, by using the first shared carrier, service data in a serving cell covered by the serving micro network node. In this way, when cell handover is performed in one micro network node group, the user equipment uses the first shared carrier, a service is not interrupted, and a delay is reduced. During inter-group handover, a service is interrupted only when the first shared carrier is switched to the second shared carrier. A combination of the two effectively reduces service interruption frequency, a service delay, and signaling consumption.

Optionally, on the basis of the embodiment corresponding to FIG. 2, in a first optional embodiment of this embodiment of the present disclosure, that the micro network node configures the micro network node according to the configuration information, and broadcasts system information of the micro network node on a shared carrier of the micro network node group specifically includes:

enabling, by the micro network node, a target shared carrier according to a shared carrier list in the configuration information, determining, by using a preset correspondence between a micro network node and a transmission resource address, a target transmission resource address corresponding to the micro network node, and sending the system information according to a time-frequency resource location indicated by the target transmission resource address, where the system information at least includes at least one piece of the following information:

a micro network node identifier, a micro network node group identifier, a shared carrier list, a micro network node resource pool, configuration information of a dedicated carrier, or the correspondence between a micro network node and a transmission resource address.

The micro network node group identifier is unique and may uniquely identify a micro network node group. The shared carrier list includes shared carriers that are opened by all micro network nodes in a micro network node group, and these shared carriers provide V2V/V2I business services for the user equipment.

The micro network resource pool includes multiple transmission resource blocks, these transmission resource blocks may be used only to transmit system information of a micro network node, and common user equipment cannot use these resources to transmit a V2V/V2I service. All members in one micro network group correspond to a same micro network node resource pool, and each micro network node uniquely corresponds to a transmission resource pool, that is, an address of a transmission resource block.

The configuration information of the dedicated carrier includes a frequency list of the dedicated carrier, a bandwidth of each frequency, and/or carrier configuration information of a carrier.

The correspondence between a micro network node and a transmission resource address may exist in a form of a list or in a form of a matrix. No specific limitation is set.

Optionally, on the basis of the embodiment corresponding to FIG. 2 and the first optional embodiment, in a second optional embodiment of this embodiment of the present disclosure, the method further includes:

after the micro network node receives a shared carrier update message that is sent by the base station and that is sent by using the micro network node group, updating the shared carrier list according to the shared carrier update message.

Figure 3:
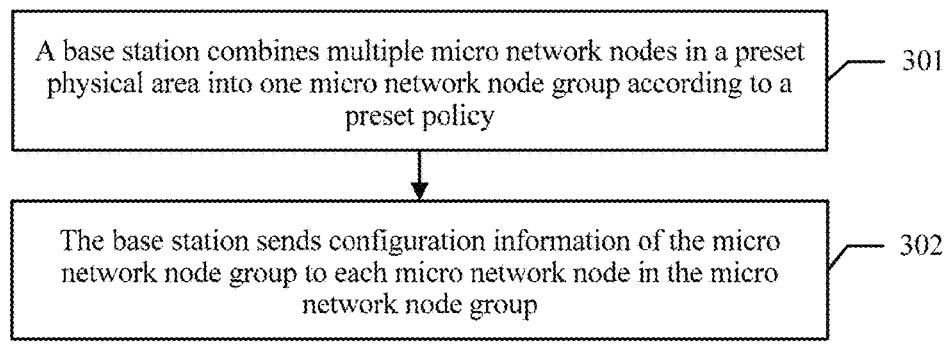
FIG. 3 is a schematic diagram of another embodiment of a network node data scheduling method according to an embodiment of the present disclosure.

The following describes a network node data scheduling method according to an embodiment of the present disclosure in detail from a base station side. Referring to FIG. 3, this embodiment of the present disclosure includes the following steps.

301. A base station combines multiple micro network nodes in a preset physical area into one micro network node group according to a preset policy.

The base station may combine micro network nodes that are adjacent to each other in a specified physical area into one micro network node group, and each micro network node may belong to only one micro network node group, or may belong to multiple micro network node groups. This specification sets no limitation to a specific cross relationship between micro network node groups.

302. The base station sends configuration information of the micro network node group to each micro network node in the micro network node group.

The base station sends the configuration information of the micro network node group to each micro network node in the micro network node group, so that the micro network node configures the micro network node according to the configuration information, and broadcasts system information of the micro network node on a shared carrier of the micro network node group, and user equipment moving in the micro network node group extracts first system information of a serving micro network node of the user equipment from the system information, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines, according to the second system information, a second shared carrier of a micro network node group to which the target micro network node belongs, and transmits the service data in the target cell by using the second shared carrier.

In this embodiment of the present disclosure, a base station combines multiple micro network nodes in a preset physical area into one micro network node group according to a preset policy, and sends configuration information of the micro network node group to each micro network node in the micro network node group, so that the micro network node configures the micro network node according to the configuration information, and broadcasts system information of the micro network node on a shared carrier of the micro network node group, and user equipment obtains first system information of a serving micro network node, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines a second shared carrier according to the second system information, and transmits the service data in the target cell by using the second shared carrier. In this way, when cell handover is performed in one micro network node group, the user equipment uses the first shared carrier, a service is not interrupted, and a delay is reduced. During inter-group handover, a service is interrupted only when the first shared carrier is switched to the second shared carrier. A combination of the two effectively reduces service interruption frequency, a service delay, and signaling consumption.

Optionally, on the basis of the embodiment corresponding to FIG. 3, in a first optional embodiment of this embodiment of the present disclosure, the method further includes:

performing, by the base station, at least one of the following steps:

configuring, by the base station, a correspondence between a micro network node and a transmission resource address; or adjusting, by the base station, a correspondence that is between a micro network node and a transmission resource address and that is sent by the micro network node group, and delivering the correspondence to the micro network node group.

Optionally, on the basis of the embodiment corresponding to FIG. 3 and the first optional embodiment, in a second optional embodiment of this embodiment of the present disclosure, the configuration information at least includes at least one piece of the following information:

a micro network node identifier, a micro network node group identifier, a shared carrier list, configuration information of a dedicated carrier, a micro network node resource pool, or the correspondence between a micro network node and a transmission resource address.

Optionally, on the basis of the second optional embodiment, in a third optional embodiment of this embodiment of the present disclosure, that the base station sends configuration information of the micro network node group to each micro network node in the micro network node group specifically includes:

sending, by the base station to each micro network node in the micro network node group, the configuration information that carries the correspondence between a micro network node and a transmission resource address, so that each micro network node determines, according to the correspondence, a target transmission resource address corresponding to the micro network node, and broadcasts the system information of the micro network node on the shared carrier by using the target transmission resource address.

Figure 4:
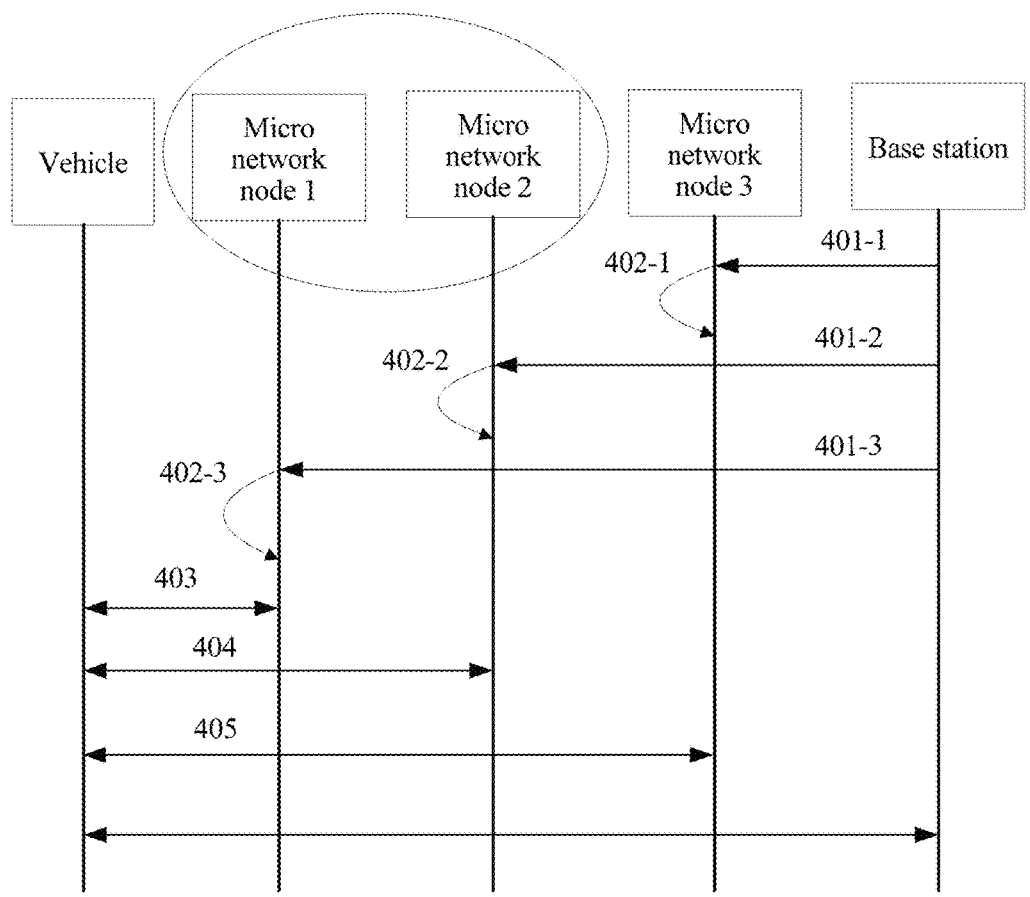
FIG. 4 is a schematic diagram of another embodiment of a network node data scheduling method according to an embodiment of the present disclosure.

To help to describe a network node data scheduling method according to an embodiment of the present disclosure in detail by using an internal signaling procedure in the following, an example in which user equipment is a vehicle that moves at high speed, both a micro network node 1 and a micro network node 2 belong to a first micro network node group, and a micro network node 3 belongs to a second micro network node group is used. Referring to FIG. 4, this embodiment of the present disclosure includes the following steps:

401. A base station delivers configuration information to a micro network node.

401-1. The base station sends first configuration information to the micro network node 3.

401-2. The base station sends second configuration information to the micro network node 2.

401-3. The base station sends the second configuration information to the micro network node 1.

402. The micro network node configures the micro network node according to the configuration information.

402-1. The micro network node 3 configures the micro network node 3 according to the first configuration information.

402-2. The micro network node 2 configures the micro network node 2 according to the second configuration information.

402-3. The micro network node 1 configures the micro network node 1 according to the second configuration information.

403. After entering a cell covered by the micro network node 1, the vehicle obtains a first shared carrier of the first micro network node group, and the vehicle transmits service data on the first shared carrier in a contention-based scheduling manner.

404. After entering a cell covered by the micro network node 2, the vehicle obtains the first shared carrier of the first micro network node group, and the vehicle continues to transmit the service data on the first shared carrier in a contention-based scheduling manner.

405. After entering a cell covered by the micro network node 3, the vehicle obtains a second shared carrier of the second micro network node group, and the vehicle transmits the service data on the second shared carrier instead of the first shared carrier in a contention-based scheduling manner.

In this embodiment of the present disclosure, a vehicle obtains a first shared carrier of a micro network node 1, and transmits service data by using the first shared carrier. When the vehicle hands over to a cell covered by a micro network node 2, the shared carrier remains unchanged, and the vehicle continues to transmit the service data by using the first shared carrier. When the vehicle hands over to a cell covered by a micro network node 3, a shared carrier is a second shared carrier, and the vehicle transmits the service data by using the second shared carrier. In this way, during intra-group cell handover, the first shared carrier continues to be used, a service is not interrupted, and a delay is reduced. During inter-group handover, a service is interrupted only when the first shared carrier is switched to the second shared carrier. A combination of the two effectively reduces service interruption frequency, a service delay, and signaling consumption.

A network node data scheduling method according to an embodiment of the present disclosure is illustrated above in detail separately from a user equipment side, a micro network node side, and a base station side. The following separately describes user equipment, a micro network node, and a base station from a perspective of an apparatus.

Figure 5:
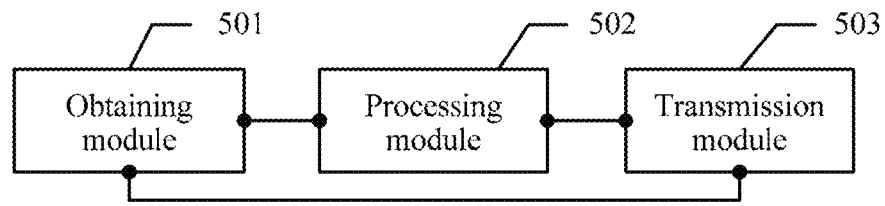
FIG. 5 is a schematic structural diagram of user equipment according to an embodiment of the present disclosure.

Referring to FIG. 5, user equipment according to an embodiment of the present disclosure includes:

an obtaining module 501, configured to: obtain system information of multiple micro network nodes in a current serving micro network node group, and extract first system information of a serving micro network node of the user equipment from the system information;

a processing module 502, configured to determine a first shared carrier of the serving micro network node group according to the first system information obtained by the obtaining module 501; and a transmission module 503, configured to transmit, according to the first system information by using the first shared carrier, service data in a serving cell covered by the serving micro network node; where the obtaining module 501 is further configured to: when it is determined that a preset cell handover condition is met, hand over to a target cell, and obtain second system information of a target micro network node corresponding to the target cell; and the transmission module 503 is further configured to transmit the service data in the target cell according to the second system information by using a second shared carrier of a micro network node group to which the target micro network node belongs.

In this embodiment of the present disclosure, an obtaining module 501 obtains first system information of a current serving micro network node, a processing module 502 determines a first shared carrier of a serving micro network node group according to the first system information, and a transmission module 503 transmits service data according to the first system information by using the first shared carrier. When it is determined that a preset cell handover condition is met, user equipment hands over to a target cell, the obtaining module 501 obtains second system information of a target micro network node corresponding to the target cell, and the transmission module 503 transmits the service data in the target cell according to the second system information by using a second shared carrier of a micro network node group to which the target micro network node belongs. This can effectively reduce service interruption frequency when the user equipment hands over to a micro cell, and reduce a service delay and signaling consumption.

Optionally, on the basis of the embodiment corresponding to FIG. 5, in a first optional embodiment of this embodiment of the present disclosure, the obtaining module 501 is further configured to:

obtain a first node set of micro network nodes that are found from a micro network resource pool corresponding to the current serving micro network node group; where that it is determined that a preset cell handover condition is met specifically includes:

when the user equipment finds a second node set of newly added micro network nodes from the micro network resource pool, and determines that signal strength of a micro network node whose signal strength is highest in the first node set and the second node set is higher than signal strength of the serving micro network node within a preset time, determining that the preset cell handover condition is met.

Optionally, on the basis of the embodiment corresponding to FIG. 5 and the first optional embodiment of this embodiment of the present disclosure, in a second optional embodiment of this embodiment of the present disclosure, the obtaining module 501 is specifically configured to:

obtain the system information from the micro network resource pool to which the current serving micro network node group belongs, and use system information whose signal strength is highest in the system information as the first system information.

Optionally, on the basis of the embodiment corresponding to FIG. 5 and the first optional embodiment of this embodiment of the present disclosure, in a third optional embodiment of this embodiment of the present disclosure, the transmission module 503 is further configured to perform at least one of the following operations:

receiving system information that is of a micro network node and that is broadcasted by a base station, where the system information at least carries at least one piece of the following information: time domain information of the micro network resource pool or frequency domain information of the micro network resource pool; or receiving radio resource control (RRC) signaling sent by the base station, where the RRC signaling at least carries at least one piece of the following information: time domain information of the micro network resource pool or frequency domain information of the micro network resource pool;

the processing module 502 is specifically configured to perform at least one of the following operations:

determining an address of the micro network resource pool according to the time domain information; or determining an address of the micro network resource pool according to the frequency domain information; and the obtaining module 501 is specifically configured to obtain the system information from the micro network resource pool according to the address of the micro network resource pool.

Optionally, on the basis of the embodiment corresponding to FIG. 5 and the first to the third optional embodiments of this embodiment of the present disclosure, in a fourth optional embodiment of this embodiment of the present disclosure, the first system information includes a serving micro network node group identifier, and the second system information includes a target micro network node group identifier;

the processing module 502 is further configured to:

when it is determined that the target micro network node group identifier is the same as the serving micro network node group identifier, determine that the second shared carrier is the same as the first shared carrier, determine that the target micro network node and the serving micro network node belong to a same micro network node group, and use the first shared carrier as the second shared carrier; and the transmission module 503 is specifically configured to:

send the service data on the first shared carrier in a contention-based scheduling manner.

Optionally, on the basis of the embodiment corresponding to FIG. 5 and the first to the fourth optional embodiments of this embodiment of the present disclosure, in a fifth optional embodiment of this embodiment of the present disclosure, the processing module 501 is further configured to:

when the system information further includes configuration information of a dedicated carrier, and it is determined that current service data needs to be transmitted on the dedicated carrier, update the configuration information of the dedicated carrier; and the transmission module 503 is further configured to transmit the service data on the dedicated carrier whose configuration information is updated.

Optionally, on the basis of the embodiment corresponding to FIG. 5 and the first to the third optional embodiments of this embodiment of the present disclosure, in a sixth optional embodiment of this embodiment of the present disclosure, the first system information includes a serving micro network node group identifier, the second system information includes a target micro network node group identifier, and the processing module 501 is specifically configured to:

when it is determined that the target micro network node group identifier is different from the serving micro network node group identifier, update the first shared carrier to the second shared carrier; and the transmission module 503 is specifically configured to:

send the service data on the second shared carrier in a contention-based scheduling manner.

Optionally, on the basis of the embodiment corresponding to FIG. 5, and the first to the third optional embodiments and the sixth optional embodiment of this embodiment of the present disclosure, in a seventh optional embodiment of this embodiment of the present disclosure, the processing module 501 is further configured to:

when the system information further includes configuration information of a dedicated carrier, and it is determined that current service data needs to be transmitted on the dedicated carrier, update the configuration information of the dedicated carrier; and the transmission module 503 is further configured to transmit the service data on the dedicated carrier whose configuration information is updated.

Optionally, on the basis of the embodiment corresponding to FIG. 5 and the first to the sixth optional embodiments of this embodiment of the present disclosure, in an eighth optional embodiment of this embodiment of the present disclosure, the processing module 501 is further configured to:

after it is determined that the service data fails to be transmitted on a shared carrier of the serving micro network node group, perform one of the following steps:

determining a base station to which the serving network node group belongs, and sending a resource scheduling request to the base station, so that the base station configures, for the user equipment, a target time-frequency resource for service transmission according to the resource scheduling request; or searching for micro network nodes in the micro network resource pool, setting, as the target micro network node, a micro network node whose signal strength is highest and is higher than a preset access threshold value, and transmitting the service data in a cell covered by the target micro network node.

Optionally, on the basis of the embodiment corresponding to FIG. 5 and the first optional embodiment of this embodiment of the present disclosure, in a ninth optional embodiment of this embodiment of the present disclosure, the transmission module 503 is specifically configured to:

transmit, in a contention-based scheduling manner according to the first system information by using the first shared carrier, the service data in the serving cell covered by the serving micro network node.

Figure 6:
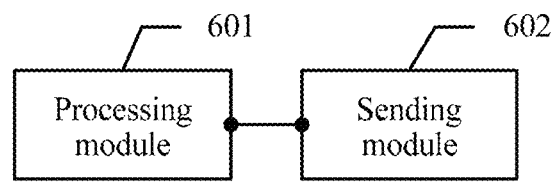
FIG. 6 is a schematic structural diagram of a micro network node according to an embodiment of the present disclosure.

Referring to FIG. 6, a micro network node according to an embodiment of the present disclosure includes:

a processing module 601, configured to: after receiving configuration information that is of a micro network node group to which the micro network node belongs and that is sent by a base station, perform micro network node configuration on the micro network node according to the configuration information; and a sending module 602, configured to broadcast system information of the micro network node on a shared carrier that is of the micro network node group and that corresponds to the configuration information received by the processing module 601, so that user equipment moving in the micro network node group obtains first system information of a serving micro network node of the user equipment, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines, according to the second system information, a second shared carrier of a micro network node group to which the target micro network node belongs, and transmits the service data in the target cell by using the second shared carrier; where shared carriers of all micro network nodes in one micro network node group have a same configuration.

In this embodiment of the present disclosure, a processing module 601 performs micro network node configuration on a micro network node according to configuration information sent by a base station, and a sending module 602 is configured to broadcast system information of the micro network node on a shared carrier that is of a micro network node group and that corresponds to the configuration information received by the processing module 601, so that user equipment obtains first system information, determines a first shared carrier of a serving micro network node group according to the first system information, and transmits service data according to the first system information by using the first shared carrier. When it is determined that a preset cell handover condition is met, the user equipment hands over to a target cell, obtains second system information, and transmits the service data in the target cell according to the second system information by using a second shared carrier. This can effectively reduce service interruption frequency when the user equipment hands over to a micro cell, and reduce a service delay and signaling consumption.

Optionally, on the basis of the embodiment corresponding to FIG. 6, in a first optional embodiment of this embodiment of the present disclosure, the processing module 601 is specifically configured to:

enable a target shared carrier according to a shared carrier list in the configuration information, and determine, by using a preset correspondence between a micro network node and a transmission resource address, a target transmission resource address corresponding to the micro network node; and the sending module 602 is specifically configured to:

send the system information according to a time-frequency resource location indicated by the target transmission resource address, where the system information at least includes at least one piece of the following information:

a micro network node identifier, a micro network node group identifier, a shared carrier list, a micro network node resource pool, configuration information of a dedicated carrier, or the correspondence between a micro network node and a transmission resource address.

Optionally, on the basis of the embodiment corresponding to FIG. 6 and the first optional embodiment of this embodiment of the present disclosure, in a second optional embodiment of this embodiment of the present disclosure, the processing module 601 is further configured to:

after a shared carrier update message that is sent by the base station and that is sent by using the micro network node group is received, update the shared carrier list according to the shared carrier update message.

Figure 7:
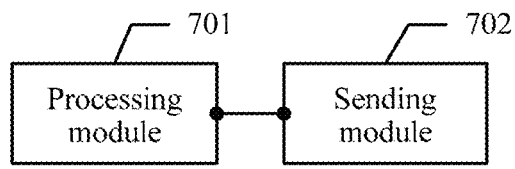
FIG. 7 is a schematic structural diagram of a base station according to an embodiment of the present disclosure.

Referring to FIG. 7, an embodiment of a base station according to an embodiment of the present disclosure includes:

a processing module 701, configured to combine multiple micro network nodes in a preset physical area into one micro network node group according to a preset policy; and a sending module 702, configured to send configuration information of the micro network node group to each micro network node in the micro network node group obtained by the processing module 701 by means of combining, so that each micro network node configures the micro network node according to the configuration information, and broadcasts system information of the micro network node on a shared carrier of the micro network node group, and user equipment moving in the micro network node group extracts first system information of a serving micro network node of the user equipment from the system information, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines, according to the second system information, a second shared carrier of a micro network node group to which the target micro network node belongs, and transmits the service data in the target cell by using the second shared carrier.

In this embodiment of the present disclosure, a processing module 701 combines multiple micro network nodes in a preset physical area into one micro network node group, and a sending module 702 sends configuration information of the micro network node group to each micro network node in the micro network node group obtained by the processing module 701 by means of combining, so that each micro network node configures the micro network node according to the configuration information, and broadcasts system information of the micro network node on a shared carrier of the micro network node group, and user equipment obtains first system information, determines a first shared carrier of a serving micro network node group according to the first system information, and transmits service data according to the first system information by using the first shared carrier. When it is determined that a preset cell handover condition is met, the user equipment hands over to a target cell, obtains second system information, and transmits the service data in the target cell according to the second system information by using a second shared carrier. This can effectively reduce service interruption frequency when the user equipment hands over to a micro cell, and reduce a service delay and signaling consumption.

Optionally, on the basis of the embodiment corresponding to FIG. 7, in a first optional embodiment of this embodiment of the present disclosure, the processing module 701 is configured to perform at least one of the following steps:

configuring a correspondence between a micro network node and a transmission resource address; or adjusting a correspondence that is between a micro network node and a transmission resource address and that is sent by the micro network node group, and delivering the correspondence to the micro network node group.

Optionally, on the basis of the embodiment corresponding to FIG. 7 and the first optional embodiment of this embodiment of the present disclosure, in a second optional embodiment of this embodiment of the present disclosure, the configuration information at least includes at least one piece of the following information:

a micro network node identifier, a micro network node group identifier, a shared carrier list, configuration information of a dedicated carrier, a micro network node resource pool, or the correspondence between a micro network node and a transmission resource address.

Optionally, on the basis of the embodiment corresponding to FIG. 7, the first optional embodiment of this embodiment of the present disclosure, and the second optional embodiment of this embodiment of the present disclosure, in a third optional embodiment of this embodiment of the present disclosure, the sending module 702 is specifically configured to:

send, to each micro network node in the micro network node group, the configuration information that carries the correspondence between a micro network node and a transmission resource address, so that each micro network node determines, according to the correspondence, a target transmission resource address corresponding to the micro network node, and broadcasts the system information of the micro network node on the shared carrier by using the target transmission resource address.

Figure 8:
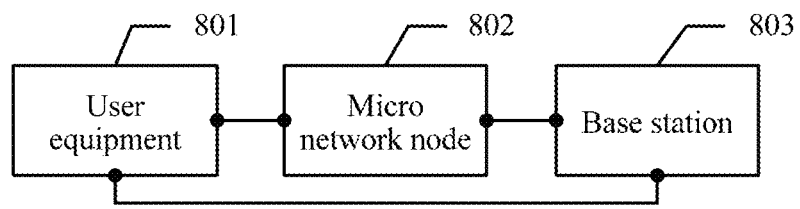
FIG. 8 is a schematic structural diagram of a communications system according to an embodiment of the present disclosure.

Referring to FIG. 8, an embodiment of the present disclosure provides a communications system, including:

the user equipment in the embodiment corresponding to FIG. 5 and the first to the ninth optional embodiments;

the micro network node in the embodiment corresponding to FIG. 6 and the first to the second optional embodiments; and the base station in the embodiment corresponding to FIG. 7 and the first to the third optional embodiments.

The present disclosure further provides a computer storage medium, the storage medium stores a program, and when being executed, the program includes some or all steps in the network node data scheduling method.

The present disclosure further provides a computer storage medium, the storage medium stores a program, and when being executed, the program includes some or all steps in the network node data scheduling method that is executed by the user equipment, the micro network node, or the base station.

Figure 9:
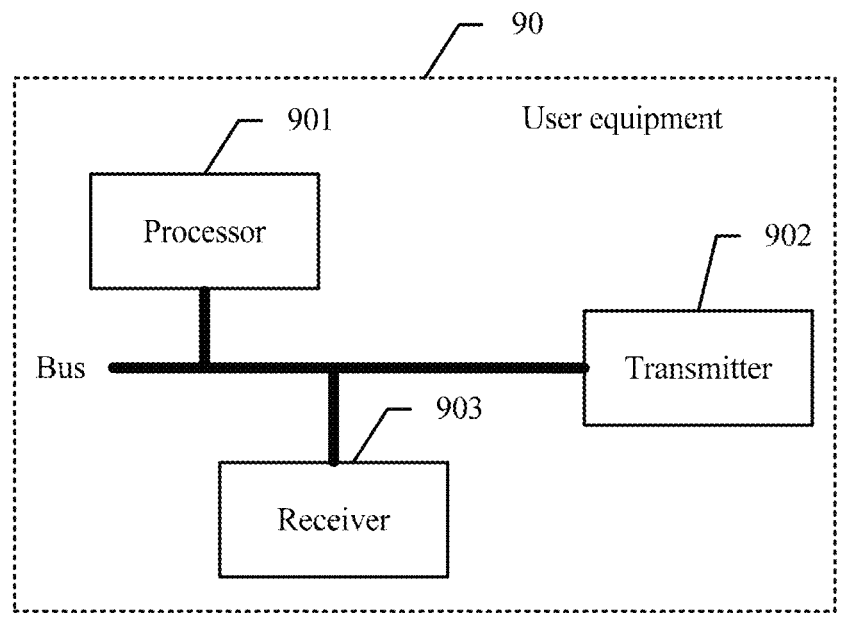
FIG. 9 is another schematic structural diagram of user equipment according to an embodiment of the present disclosure.

FIG. 9 is another schematic structural diagram of user equipment 90 according to an embodiment of the present disclosure. The user equipment 90 may include at least one network interface or another communications interface, at least one receiver 901, at least one transmitter 902, at least one processor 903, a memory 904, and a bus configured to implement a connection and communication between these apparatuses. At least one network interface (which may be wired or wireless) may be used to implement a communication connection between a system gateway and at least one another network element by using the Internet, a wide area network, a local area network, a metropolitan area network, and the like.

The memory 904 may include a read-only memory and a random access memory, and provide an instruction and data for the processor 903. A part of the memory 904 may include a high-speed random access memory (RAM), or may further include a non-volatile memory (non-volatile memory).

The memory 904 stores the following elements: an executable module or a data structure, a subset of an executable module or a data structure, or an extended set of an executable module or a data structure.

An operation instruction includes various operation instructions to implement various operations.

An operating system includes various system programs to implement various basic services and process hardware-based tasks.

In this embodiment of the present disclosure, the processor 903 executes the following operations by invoking an operation instruction stored in the memory 904 (the operation instruction may be stored in the operating system):

obtaining system information of multiple micro network nodes in a current serving micro network node group, and extracting first system information of a serving micro network node of the user equipment from the system information;

determining a first shared carrier of the serving micro network node group according to the first system information;

transmitting, according to the first system information by using the first shared carrier, service data in a serving cell covered by the serving micro network node; and when it is determined that a preset cell handover condition is met, handing over to a target cell, obtaining second system information of a target micro network node corresponding to the target cell, and transmitting the service data in the target cell according to the second system information by using a second shared carrier of a micro network node group to which the target micro network node belongs.

In some implementations, the processor 903 may further perform the following step:

obtaining a first node set of micro network nodes that are found from a micro network resource pool corresponding to the current serving micro network node group; where that it is determined that a preset cell handover condition is met specifically includes:

when the user equipment finds a second node set of newly added micro network nodes from the micro network resource pool, and determines that signal strength of a micro network node whose signal strength is highest in the first node set and the second node set is higher than signal strength of the serving micro network node within a preset time, determining that the preset cell handover condition is met.

In some implementations, the processor 903 may further perform the following steps:

obtaining the system information from the micro network resource pool to which the current serving micro network node group belongs, and using system information whose signal strength is highest in the system information as the first system information.

In some implementations, the processor 903 may further perform the following step:

before the obtaining system information of multiple micro network nodes in a current serving micro network node group, further performing at least one of the following operations:

receiving, by using the receiver 901, system information that is of a micro network node and that is broadcasted by a base station, where the system information at least carries at least one piece of the following information: time domain information of the micro network resource pool or frequency domain information of the micro network resource pool; or receiving, by using the receiver 901, radio resource control (RRC) signaling sent by the base station, where the RRC signaling at least carries at least one piece of the following information: time domain information of the micro network resource pool or frequency domain information of the micro network resource pool.

Further, the processor 903 performs at least the following operations:

determining an address of the micro network resource pool according to the time domain information; or determining an address of the micro network resource pool according to the frequency domain information; and obtaining the system information from the micro network resource pool according to the address of the micro network resource pool.

In some implementations, the processor 903 may further perform the following steps:

when it is determined that a target micro network node group identifier is the same as a serving micro network node group identifier, determining that the second shared carrier is the same as the first shared carrier, determining that the target micro network node and the serving micro network node belong to a same micro network node group, using the first shared carrier as the second shared carrier, and sending the service data on the first shared carrier in a contention-based scheduling manner.

The first system information includes the serving micro network node group identifier, and the second system information includes the target micro network node group identifier.

In some implementations, the system information further includes configuration information of a dedicated carrier, and the processor 903 may further perform the following steps:

when it is determined that current service data needs to be transmitted on the dedicated carrier, updating the configuration information of the dedicated carrier, and transmitting the service data on the dedicated carrier whose configuration information is updated.

In some implementations, the first system information includes a serving micro network node group identifier, the second system information includes a target micro network node group identifier, and the processor 903 may further perform the following steps:

when it is determined that the target micro network node group identifier is different from the serving micro network node group identifier, updating the first shared carrier to the second shared carrier, and sending the service data on the second shared carrier in a contention-based scheduling manner.

In some implementations, the system information further includes configuration information of a dedicated carrier, and the processor 903 may further perform the following steps:

when it is determined that current service data needs to be transmitted on the dedicated carrier, updating the configuration information of the dedicated carrier, and transmitting the service data on the dedicated carrier whose configuration information is updated.

In some implementations, the processor 903 may further perform the following step:

after the extracting first system information of a serving micro network node of the user equipment from the system information, performing at least one of the following operations:

after it is determined that the service data fails to be transmitted on a shared carrier of the serving micro network node group, performing one of the following steps:

determining a base station to which the serving micro network node group belongs, and sending a resource scheduling request to the base station by using the transmitter 902, so that the base station configures, for the user equipment, a target time-frequency resource for service transmission according to the resource scheduling request; or searching for micro network nodes in the micro network resource pool, setting, as the target micro network node, a micro network node whose signal strength is highest and is higher than a preset access threshold value, and transmitting the service data in a cell covered by the target micro network node.

In some implementations, the processor 903 may further perform the following step:

transmitting, in a contention-based scheduling manner according to the first system information by using the first shared carrier, the service data in the serving cell covered by the serving micro network node.

Figure 10:
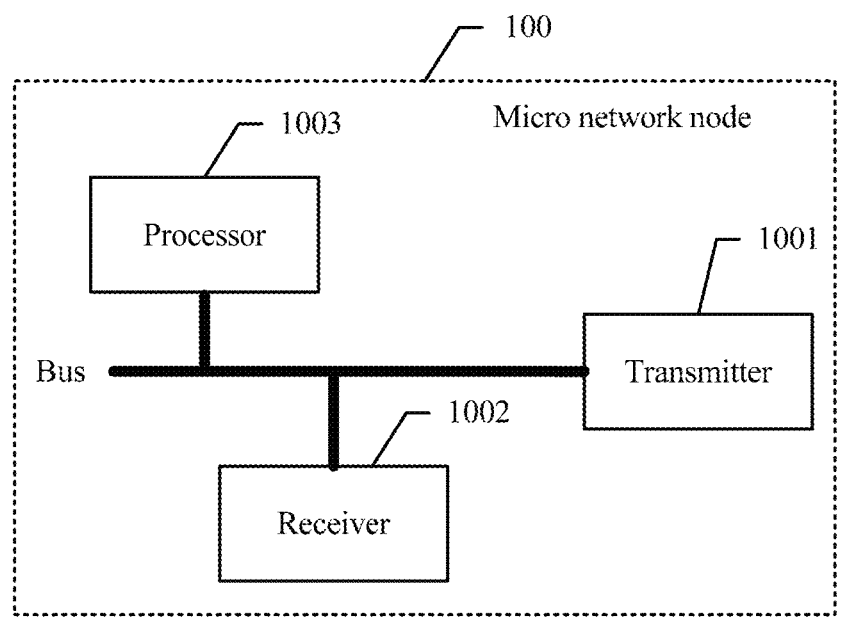
FIG. 10 is another schematic structural diagram of a micro network node according to an embodiment of the present disclosure.

FIG. 10 is another schematic structural diagram of a micro network node 100 according to an embodiment of the present disclosure. The micro network node 100 may include at least one network interface or another communications interface, at least one receiver 1001, at least one transmitter 1002, at least one processor 1003, a memory 1004, and a bus configured to implement a connection and communication between these apparatuses. At least one network interface (which may be wired or wireless) may be used to implement a communication connection between the system gateway and at least one another network element by using the Internet, a wide area network, a local area network, a metropolitan area network, and the like.

The memory 1004 may include a read-only memory and a random access memory, and provide an instruction and data for the processor 1003. A part of the memory 1004 may include a high-speed random access memory (RAM), or may further include a non-volatile memory.

The memory 1004 stores the following elements: an executable module or a data structure, a subset of an executable module or a data structure, or an extended set of an executable module or a data structure.

An operation instruction includes various operation instructions to implement various operations.

An operating system includes various system programs to implement various basic services and process hardware-based tasks.

In this embodiment of the present disclosure, the processor 1003 executes the following operations by invoking an operation instruction stored in the memory 1004 (the operation instruction may be stored in the operating system):

after the receiver 1001 receives configuration information that is of a micro network node group to which the micro network node belongs and that is sent by a base station, performing micro network node configuration on the micro network node according to the configuration information; and broadcasting system information of the micro network node on a shared carrier of the micro network node group by using the transmitter 1002, so that user equipment running in the micro network node group obtains first system information of a serving micro network node of the user equipment, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines, according to the second system information, a second shared carrier of a micro network node group to which the target micro network node belongs, and transmits the service data in the target cell by using the second shared carrier; where shared carriers of all micro network nodes in one micro network node group have a same configuration.

In some implementations, the processor 1003 may further perform the following steps:

enabling a target shared carrier according to a shared carrier list in the configuration information, determining, by using a preset correspondence between a micro network node and a transmission resource address, a target transmission resource address corresponding to the micro network node, and sending, by using the transmitter 1002, the system information according to a time-frequency resource location indicated by the target transmission resource address, where the system information at least includes at least one piece of the following information:

a micro network node identifier, a micro network node group identifier, a shared carrier list, a micro network node resource pool, configuration information of a dedicated carrier, or the correspondence between a micro network node and a transmission resource address.

In some implementations, the processor 1003 may further perform the following step:

after the receiver 1001 receives a shared carrier update message that is sent by the base station and that is sent by using the micro network node group, updating the shared carrier list according to the shared carrier update message.

Figure 11:
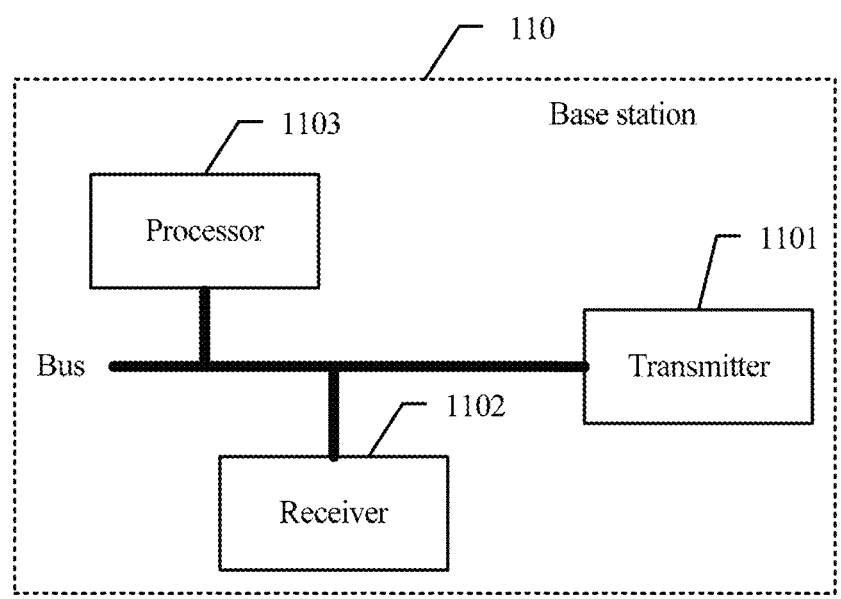
FIG. 11 is another schematic structural diagram of a base station according to an embodiment of the present disclosure.

FIG. 11 is another schematic structural diagram of a base station 110 according to an embodiment of the present disclosure. The base station 110 may include at least one network interface or another communications interface, at least one receiver 1101, at least one transmitter 1102, at least one processor 1103, a memory 1104, and a bus configured to implement a connection and communication between these apparatuses. At least one network interface (which may be wired or wireless) may be used to implement a communication connection between the system gateway and at least one another network element by using the Internet, a wide area network, a local area network, a metropolitan area network, and the like.

The memory 1104 may include a read-only memory and a random access memory, and provide an instruction and data for the processor 1103. A part of the memory 1104 may include a high-speed random access memory (RAM), or may further include a non-volatile memory.

The memory 1104 stores the following elements: an executable module or a data structure, a subset of an executable module or a data structure, or an extended set of an executable module or a data structure.

An operation instruction includes various operation instructions to implement various operations.

An operating system includes various system programs to implement various basic services and process hardware-based tasks.

In this embodiment of the present disclosure, the processor 1103 executes the following operations by invoking an operation instruction stored in the memory 1104 (the operation instruction may be stored in the operating system):

combining multiple micro network nodes in a preset physical area into one micro network node group according to a preset policy; and sending configuration information of the micro network node group to each micro network node in the micro network node group by using the transmitter 1102, so that the micro network node configures the micro network node according to the configuration information, and broadcasts system information of the micro network node on a shared carrier of the micro network node group, and user equipment moving in the micro network node group extracts first system information of a serving micro network node of the user equipment from the system information, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines, according to the second system information, a second shared carrier of a micro network node group to which the target micro network node belongs, and transmits the service data in the target cell by using the second shared carrier.

In some implementations, the processor 1103 may further perform at least one of the following steps:

configuring a correspondence between a micro network node and a transmission resource address; or adjusting a correspondence that is between a micro network node and a transmission resource address and that is sent by the micro network node group, and delivering the correspondence to the micro network node group by using the transmitter 1102.

The configuration information at least includes at least one piece of the following information:

a micro network node identifier, a micro network node group identifier, a shared carrier list, configuration information of a dedicated carrier, a micro network node resource pool, or the correspondence between a micro network node and a transmission resource address.

In some implementations, the processor 1103 may further perform the following step:

sending, by using the transmitter 1102 to each micro network node in the micro network node group, the configuration information that carries the correspondence between a micro network node and a transmission resource address, so that each micro network node determines, according to the correspondence, a target transmission resource address corresponding to the micro network node, and broadcasts the system information of the micro network node on the shared carrier by using the target transmission resource address.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A network node data scheduling method, an apparatus, and a system that are provided in the present disclosure are described in detail above. In this specification, specific examples are used to describe the principle and implementations of the present disclosure, and the description of the embodiments is only intended to help understand the method and core idea of the present disclosure. In addition, a person of ordinary skill in the art may, based on the idea of the present disclosure, make modifications with respect to the specific implementations and the application scope. Therefore, the content of this specification shall not be construed as a limitation to the present disclosure.

What is claimed is:

1. A network node data scheduling method, comprising:
combining, by a base station, multiple micro network nodes in a preset physical area into one micro network node group according to a preset policy; and
sending, by the base station, configuration information of the micro network node group to each micro network node in the micro network node group, so that the micro network node configures the micro network node according to the configuration information, and broadcasts system information of the micro network node on a shared carrier of the micro network node group, and user equipment moving in the micro network node group extracts first system information of a serving micro network node of the user equipment from the system information, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines, according to the second system information, a second shared carrier of a micro network node group to which the target micro network node belongs, and transmits the service data in the target cell by using the second shared carrier.

2. The method according to claim 1, further comprising:
configuring, by the base station, a correspondence between a micro network node and a transmission resource address; or
adjusting, by the base station, a correspondence between a micro network node and a transmission resource address sent by the micro network node group, and delivering the correspondence to the micro network node group.

3. The method according to claim 1, wherein the configuration information comprises at least one of the following information:
a micro network node identifier, a micro network node group identifier, a shared carrier list, configuration information of a dedicated carrier, a micro network node resource pool, or the correspondence between a micro network node and a transmission resource address.

4. The method according to claim 3, wherein sending, by the base station, configuration information of the micro network node group to each micro network node in the micro network node group comprises:
sending, by the base station to each micro network node in the micro network node group, the configuration information that carries the correspondence between a micro network node and a transmission resource address, so that each micro network node determines, according to the correspondence, a target transmission resource address corresponding to the micro network node, and broadcasts the system information of the micro network node on the shared carrier by using the target transmission resource address.

5. User equipment, comprising:
an obtaining module, configured to: obtain system information of multiple micro network nodes in a current serving micro network node group, and extract first system information of a serving micro network node of the user equipment from the system information;
a processing module, configured to determine a first shared carrier of the serving micro network node group according to the first system information obtained by the obtaining module;
a transmission module, configured to transmit, according to the first system information by using the first shared carrier, service data in a serving cell covered by the serving micro network node;
wherein the obtaining module is further configured to: when it is determined that a preset cell handover condition is met, hand over to a target cell, and obtain second system information of a target micro network node corresponding to the target cell; and
wherein the transmission module is further configured to transmit the service data in the target cell according to the second system information by using a second shared carrier of a micro network node group to which the target micro network node belongs.

6. The user equipment according to claim 5, wherein:
the obtaining module is further configured to obtain a first node set of micro network nodes that are found from a micro network resource pool corresponding to the current serving micro network node group; and
when the user equipment finds a second node set of newly added micro network nodes from the micro network resource pool, and determines that signal strength of a micro network node whose signal strength is highest in the first node set and the second node set is higher than signal strength of the serving micro network node within a preset time, determining that the preset cell handover condition is met.

7. The user equipment according to claim 5, wherein the obtaining module is configured to:
obtain the system information from the micro network resource pool to which the current serving micro network node group belongs, and use system information whose signal strength is highest in the system information as the first system information.

8. The user equipment according to claim 5, wherein:
the transmission module is further configured to:
receive system information that is of a micro network node and that is broadcast by a base station, wherein the system information comprises at least one of the following information: time domain information of the micro network resource pool or frequency domain information of the micro network resource pool, or
receive radio resource control (RRC) signaling sent by the base station, wherein the RRC signaling comprises at least one of the following information: time domain information of the micro network resource pool or frequency domain information of the micro network resource pool;
the processing module is configured to:
determine an address of the micro network resource pool according to the time domain information, or
determine an address of the micro network resource pool according to the frequency domain information; and
the obtaining module is configured to obtain the system information from the micro network resource pool according to the address of the micro network resource pool.

9. The user equipment according to claim 5, wherein:
the first system information comprises a serving micro network node group identifier, and the second system information comprises a target micro network node group identifier;
the processing module is further configured to: when it is determined that the target micro network node group identifier is the same as the serving micro network node group identifier, determine that the second shared carrier is the same as the first shared carrier, determine that the target micro network node and the serving micro network node belong to a same micro network node group, and use the first shared carrier as the second shared carrier; and
the transmission module is configured to send the service data on the first shared carrier in a contention-based scheduling manner.

10. The user equipment according to claim 5, wherein:
the processing module is further configured to: when the system information further comprises configuration information of a dedicated carrier, and it is determined that current service data needs to be transmitted on the dedicated carrier, update the configuration information of the dedicated carrier; and
the transmission module is further configured to transmit the service data on the dedicated carrier whose configuration information is updated.

11. The user equipment according to claim 5, wherein:
the first system information comprises a serving micro network node group identifier, and the second system information comprises a target micro network node group identifier;
the processing module is specifically configured to:
when it is determined that the target micro network node group identifier is different from the serving micro network node group identifier, update the first shared carrier to the second shared carrier; and
the transmission module is configured to send the service data on the second shared carrier in a contention-based scheduling manner.

12. The user equipment according to claim 5, wherein:
the processing module is further configured to:
when the system information further comprises configuration information of a dedicated carrier, and it is determined that current service data needs to be transmitted on the dedicated carrier, update the configuration information of the dedicated carrier; and
the transmission module is further configured to transmit the service data on the dedicated carrier whose configuration information is updated.

13. The user equipment according to claim 5, wherein after it is determined that the service data fails to be transmitted on a shared carrier of the serving micro network node group, the processing module is configured to:
determine a base station to which the serving network node group belongs, and send a resource scheduling request to the base station, so that the base station configures, for the user equipment, a target time-frequency resource for service transmission according to the resource scheduling request; or
search for micro network nodes in the micro network resource pool, set, as the target micro network node, a micro network node whose signal strength is highest and is higher than a preset access threshold value, and transmit the service data in a cell covered by the target micro network node.

14. The user equipment according to claim 5, wherein the transmission module is configured to:
transmit, in a contention-based scheduling manner according to the first system information by using the first shared carrier, the service data in the serving cell covered by the serving micro network node.

15. A base station, comprising:
a processing module, configured to combine multiple micro network nodes in a preset physical area into one micro network node group according to a preset policy; and
a sending module, configured to send configuration information of the micro network node group to each micro network node in the micro network node group obtained by the processing module by means of combining, so that each micro network node configures the micro network node according to the configuration information, and broadcasts system information of the micro network node on a shared carrier of the micro network node group, and user equipment moving in the micro network node group extracts first system information of a serving micro network node of the user equipment from the system information, determines a first shared carrier of a serving micro network node group according to the first system information, and transmits, by using the first shared carrier, service data in a serving cell covered by the serving micro network node; when it is determined that a preset cell handover condition is met, the user equipment hands over to a target cell, obtains second system information of a target micro network node corresponding to the target cell, determines, according to the second system information, a second shared carrier of a micro network node group to which the target micro network node belongs, and transmits the service data in the target cell by using the second shared carrier.

16. The base station according to claim 15, wherein the processing module is configured to:
configure a correspondence between a micro network node and a transmission resource address; or
adjust a correspondence that is between a micro network node and a transmission resource address and that is sent by the micro network node group, and deliver the correspondence to the micro network node group.

17. The base station according to claim 15, wherein the configuration information comprises at least one of the following information:
a micro network node identifier, a micro network node group identifier, a shared carrier list, configuration information of a dedicated carrier, a micro network node resource pool, or the correspondence between a micro network node and a transmission resource address.

18. The base station according to claim 15, wherein the sending module is configured to:
send, to each micro network node in the micro network node group, the configuration information that carries the correspondence between a micro network node and a transmission resource address, so that each micro network node determines, according to the correspondence, a target transmission resource address corresponding to the micro network node, and broadcasts the system information of the micro network node on the shared carrier by using the target transmission resource address.

* * * * *